United States Patent [19]

Burton et al.

[11] Patent Number: 5,710,943
[45] Date of Patent: Jan. 20, 1998

[54] TIME BASED DATA RETENTION IN A VARIABLE DATA RATE DISK DRIVE

[75] Inventors: Scott Burton, Westminster; Lance R. Carlson; Stephen R. Cornaby, both of Niwot, all of Colo.

[73] Assignee: Maxtor Corporation, Longmont, Colo.

[21] Appl. No.: 497,299

[22] Filed: Jun. 30, 1995

[51] Int. Cl.$^6$ .................................................. G06F 13/00
[52] U.S. Cl. .................................................. 395/872; 395/250
[58] Field of Search .................................. 395/250, 872

[56] References Cited

U.S. PATENT DOCUMENTS

| | | | |
|---|---|---|---|
| 5,235,692 | 8/1993 | Ayres et al. | 395/849 |
| 5,241,666 | 8/1993 | Idleman et al. | 395/872 |
| 5,249,271 | 9/1993 | Hopkinson et al. | 395/377 |
| 5,303,349 | 4/1994 | Warriner et al. | 395/882 |
| 5,398,253 | 3/1995 | Gordon | 371/40.4 |

*Primary Examiner*—Parshotam S. Lall
*Assistant Examiner*—Kenneth R. Coulter
*Attorney, Agent, or Firm*—Sheridan Ross P.C.

[57] ABSTRACT

The present invention provides a method and apparatus for assuring that the desired data is transferred between a variable rate disk drive and a host system during read and write operations. The invention involves retaining a variable amount of data in a buffer memory after the data has been transferred between the buffer memory and a magnetic disk with the variable amount of data retained based upon a predetermined fixed period of time associated with error conditions and a disk transfer rate. If an error condition is detected during a transfer of data between the buffer memory and the disk, all of the retained data may be retransferred after the error condition has been corrected.

23 Claims, 8 Drawing Sheets

Fig. 6A

TIME BASED DATA RETENTION IN A VARIABLE DATA RATE DISK DRIVE

FIELD OF THE INVENTION

The invention relates in general to computer disk drives and, more particularly, to the protection of data being transferred between a magnetic medium in a computer disk drive and an exterior environment.

BACKGROUND OF THE INVENTION

Computer disk drives contain a magnetic disk which rotates relative to a read/write head. The magnetic disk is typically formatted into a number of concentric tracks for storing data on a surface of the disk in the form of magnetic polarity transitions. The head is capable of both inducing magnetic polarity transitions into the surface of the disk during a write operation and sensing magnetic polarity transitions from the surface of the disk during a read operation. Some disk drives use separate elements to perform the read and write operations.

FIG. 1 illustrates a typical formatting scheme for a magnetic disk 10. As seen in the figure, the disk 10 includes a plurality of tracks 12, including an innermost track 12a and an outermost track 12e. Each track 12 of the magnetic disk 10 is divided into a number of data regions 14 of substantially equal angular length. These data regions 14 are separated from one another by servo sample regions 16 which contain information necessary to accurately position a read/write element (not shown) above the magnetic disk 10. Like the data regions 14, all servo sample regions 16 on a track are of substantially equal angular length. Consequently, all of the tracks 12 on the magnetic disk 10 contain the same number of data regions 14 and servo sample regions 16. It should be understood that the magnetic disk 10 of FIG. 1 is simplified for illustration purposes and that magnetic disks normally include a much larger number of tracks and a much larger number of data regions/servo sample regions per track.

To take advantage of the fact that there is more physical space in the outer tracks of a magnetic disk, the amount of data stored in the data regions of the outer tracks of the disk can be made greater than the amount of data stored in the data regions 14 of the inner tracks of the disk. In fact, the amount of data per data region may increase as a function of the radial distance of the track. For example, in the magnetic disk 10 of FIG. 1, the data region 14 of the innermost track 12a contains only two data elements 18a, 18b while the data region 14 of the outermost track 12e contains 32 data elements 20a–20ee. It should be understood that the phrase "data element" as used herein refers to a group of data of a particular size, such as a bit or a byte. It should also be understood that the magnetic disk 10 of FIG. 1 is simplified for illustration purposes and that magnetic disks normally include a much larger number of data elements per data region and a much more gradual increase in the data elements per data region ratio from track to track. For example, the data stored on the outer tracks of a disk normally have the same physical density, i.e. bits per inch, as the data stored on the inner tracks; however, because the outer tracks are physically longer, they hold more data.

In a disk drive having a data element per data region ratio which varies from track to track, data is written to and read from the magnetic disk at a variable data rate. Such a disk drive is known as a variable data rate disk drive. To illustrate why the data rate is variable in such a disk drive, reference is again made to FIG. 1. Because the disk 10 will be rotating at a constant angular velocity, a stationary read/write head will encounter servo sample regions at constant time intervals. These constant time intervals will be the same regardless of which track 12 the read/write head is currently over. However, because there is more data between servo sample regions on some tracks than other tracks, the amount of data encountered by the read/write head during each constant time interval, i.e., the data rate, will vary from track to track. For example, if the disk 10 of FIG. 1 were rotating at a speed such that a servo sample region 16 were encountered every 1 second, the data rate of track 12a would be 2 data elements per second and the data rate of track 12e would be 32 data elements per second.

Data to be stored on a magnetic disk is generally divided into a plurality of equal length data sectors. A typical data sector, for example, may contain 512 bytes of data. The amount of data which may be stored in a data region of a particular track of a magnetic disk may be more, less, or the same as the amount of data in a single data sector. Therefore, the ratio of the number of data sectors which may be stored on a particular track to the number of data regions on that track may be greater than, less than, or equal to one. Because there is generally more data per data region in the outer tracks, the above mentioned ratio generally increases as one goes from the inner track to the outer track of a magnetic disk. FIG. 2 illustrates a number of data tracks having different data sector per data region ratios. As seen in the figure, a data sector may begin and end in the same data region or may begin in one data region and end in another.

As discussed previously, a disk drive is capable of performing a write operation and a read operation. During a write operation, the disk drive receives data from a host computer along with instructions to store the data to a specific location, or set of locations, on the magnetic disk. The disk drive then moves the read/write head to that location, or set of locations, and writes the received data. During a read operation, the disk drive receives instructions from a host computer to access data stored at a specific location, or set of locations, and to transfer that data to the host computer. The disk drive then moves the read/write head to that location, or set of locations, senses the data stored there, and transfers that data to the host.

To improve data transfer rate performance between the magnetic disk and the host computer, i.e., to compensate for transfer rate differences between the disk drive and the host, disk drives normally include a solid state buffer memory. This buffer memory is operative for providing temporary storage for data being transferred between the magnetic disk and the host computer during both read and write operations. The buffer memory is generally divided into a number of separate storage locations, each location being capable of storing one data sector of information. If the amount of data being transferred between the disk and the host, during either a read or write operation, is greater than the capacity of the buffer memory, data transfer to the buffer memory is temporarily suspended until space is freed up in the buffer memory. Space is freed up, or released, in the buffer memory only after the disk drive determines that the sector of data stored in a particular buffer memory storage location has been successfully transferred between the magnetic disk and the buffer memory. During a write operation, this implies that no error conditions occurred while the data sector was being written from the buffer memory storage location to the disk. During a read operation, this implies that no error conditions occurred while the data sector was being read from the disk and transferred to the buffer memory storage location. After the disk drive determines that no error conditions have occurred during a read operation, the subject data sector must be transferred from the buffer memory to the host computer before the associated buffer memory storage location can be released. In general, if an error condition occurs while a transfer of data is taking place between the disk and the buffer, it is desirable to retransfer the potentially compromised data. However, known methods and apparatuses for retransferring data between a buffer and a disk make inefficient use of the buffer and, as a consequence, reduce data transfer performance.

Therefore, a need exists for a method and apparatus for efficiently determining whether data stored in a buffer memory in a variable data rate disk drive has been successfully transferred between the buffer memory and a magnetic disk, during both read and write operations, so that the buffer memory locations storing that data may be released to accept new data.

SUMMARY OF THE INVENTION

The present invention provides a method and apparatus for meeting the above mentioned needs. The invention accomplishes this by varying the amount of data retained in the buffer memory after the data has been transferred between the buffer memory and the magnetic disk, with the varying amount based upon a predetermined fixed period of time, that is related to one or more error conditions and that require retransfer of the data, and the data rate. By varying the amount of data retained in the buffer, efficient use of the buffer is achieved. In particular, the amount of data transferred between the disk and host system per unit of time can be improved relative to known disk drive systems. If an error condition is detected during a transfer of data between the buffer memory and the disk, all of the retained data may be retransferred after the error condition has been corrected. In another aspect of the invention, the retained data is retained for the predetermined fixed period of time. After this time period has elapsed, the buffer memory location holding the sector of retained data may be released to allow the storage of new data.

In conceiving of the present invention, it was discovered that error events which commonly occur in disk drives, such as physical shock, tend to affect the disk drive for a fixed amount of time. It was also appreciated that a time delay may exist between the actual occurrence of an error event and the detection of the event. Therefore, detection of an error event signifies that the data which has most recently been transferred, i.e., within a previous fixed time period ending with the detection of the error event, between the buffer memory and the disk may have been compromised.

Because the data which may have been compromised was transferred within a previous fixed time period of the occurrence of the error event and the data rate of the disk drive varies from track to track, the amount of data retained by the buffer in the present invention is based on the fixed time period and the varying data rate. As a consequence, the amount of retained data is variable, rather than fixed.

BRIEF DESCRIPTION OF THE DRAWINGS

FIGS. 6A and 6B are a series of operational frames illustrating the operation of the same embodiment of the present invention as FIGS. 5A and 5B using a data track having a data sector/data region ratio of 1:2.

DETAILED DESCRIPTION

The present invention provides a method and apparatus for assuring that the desired data is transferred between a variable rate disk drive and a host system during read and write operations. The invention involves retaining a variable amount of data in a buffer memory after the data has been transferred between the buffer memory and a magnetic disk with the variable amount of retained data based upon a predetermined fixed period of time associated with error conditions and a data transfer rate. If an error condition is detected during a transfer of data between the buffer memory and the disk, all of the retained data may be retransferred after the error condition has been corrected.

Figure 3:
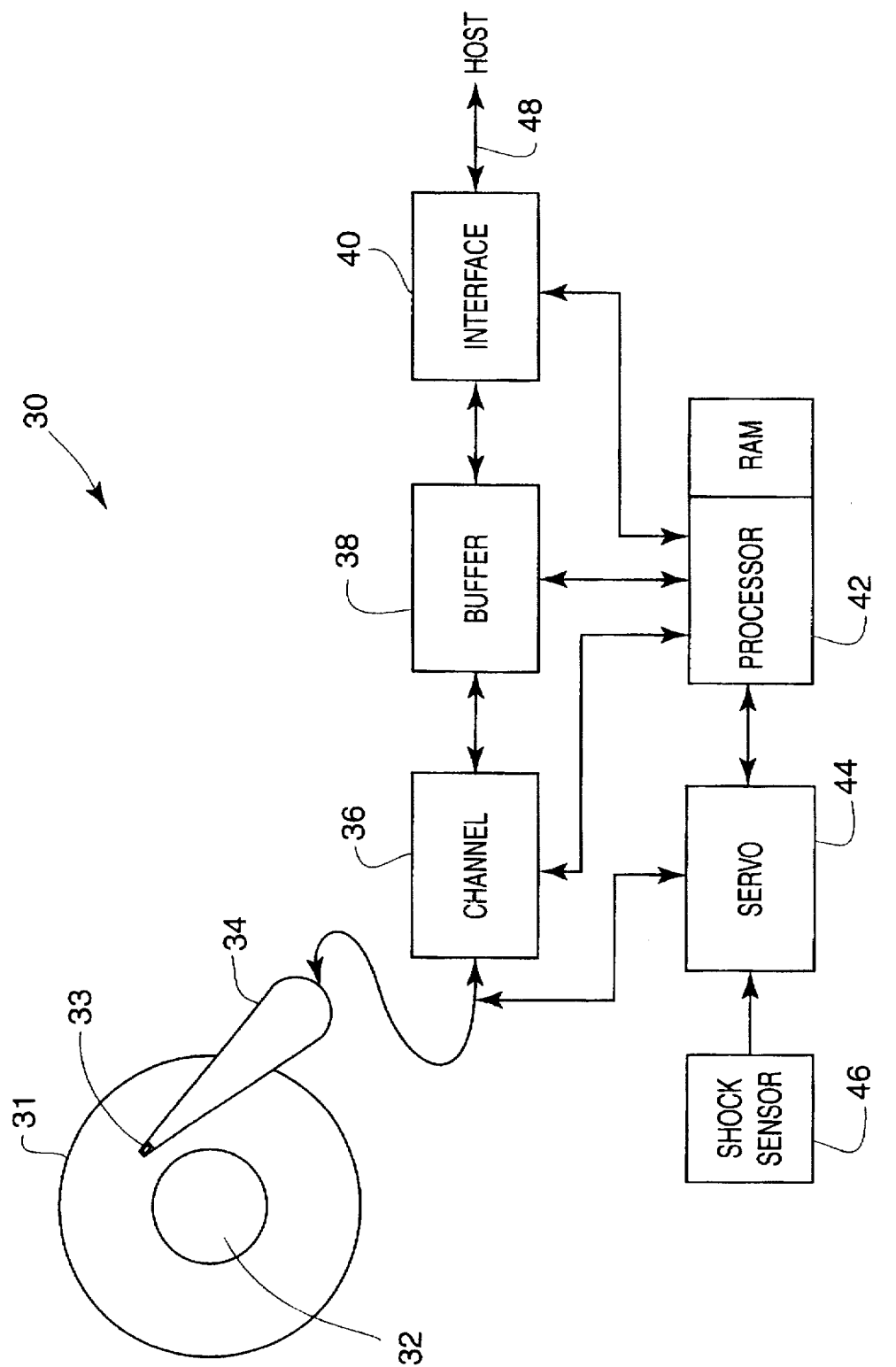
FIG. 3 is a block diagram illustrating a disk drive system using one embodiment of the present invention.

FIG. 3 illustrates a disk drive system 30 using one embodiment of the present invention. The disk drive system 30 is operative for both storing data received from a host computer during a write operation, and for retrieving previously stored data for use by the host computer during a read operation. As illustrated in the figure, the system 30 includes: a magnetic disk 31, a spin motor 32, a read/write head 33, an actuator assembly 34 that includes a voice coil motor, a variable data rate channel 36, a buffer memory 38, an interface 40, a processor having internal RAM 42, a servo unit 44, and a shock sensor unit 46.

Figure 1:
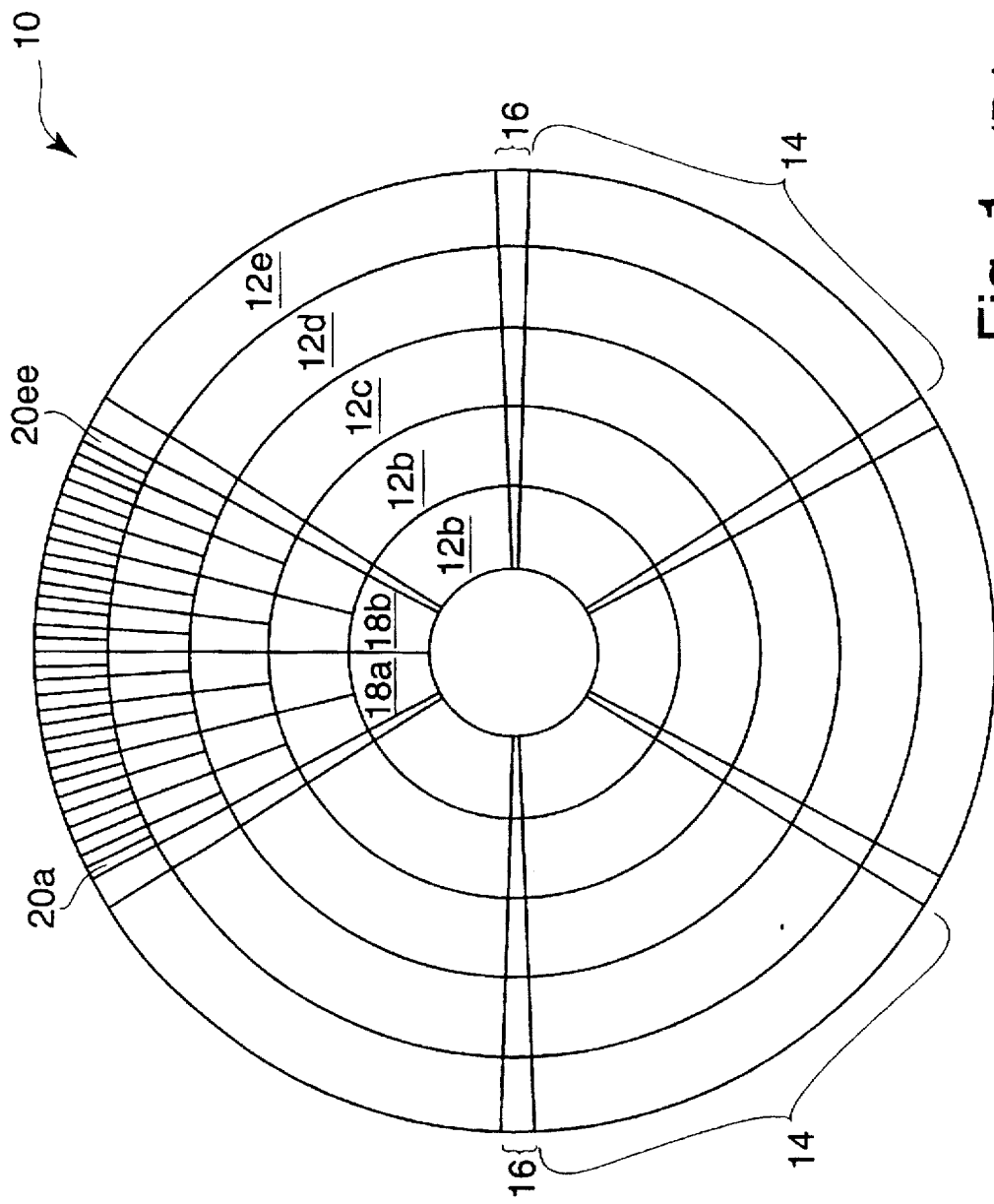
FIG. 1 is a top view of a magnetic disk, illustrating a data format which may be used in the present invention.
Figure 2:
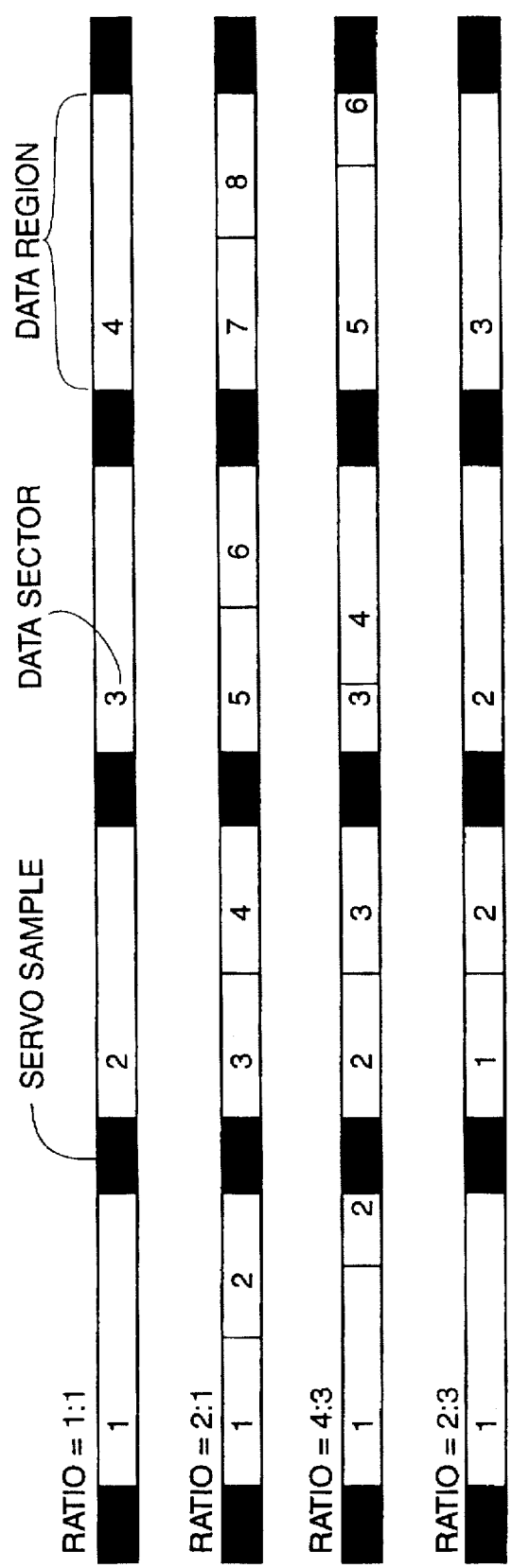
FIG. 2 is a diagram illustrating tracks of a magnetic disk having various data sector/data region ratios.

The magnetic disk 31 is operative for storing data in the form of magnetic polarity transitions and may have the format of the disk 10 of FIG. 1. During operation, the disk 32 is rotated at a constant angular velocity using the spindle motor 32. The read/write head 33 is operative for reading and writing data to the magnetic disk 31 and for sensing servo data from the servo sample regions of the magnetic disk 31. The actuator assembly 34 is operative for locating the read/write head 33 over a particular track of the magnetic disk 31 in response to a signal from the servo unit 44.

The channel 36 is operative for transferring data to and from the read/write head 33 and for processing this data during read and write operations. During write operations, the channel receives the data which is to be written to the magnetic disk and converts it to a write current signal required by the read/write head 33 to induce the proper magnetic polarity transitions into the surface of the disk 32. During a read operation, the channel 36 is operative for receiving an analog read signal from the read/write head 33 and for detecting the data in that signal to produce a digital output signal representative of the data originally stored on the disk 32. Operation of the channel 36 is controlled by the processor 42.

The buffer memory 38 is operative for providing temporary storage for data being transferred between the magnetic disk 31 and an external host computer to compensate for transfer rate differences between the disk drive and the host computer. In this regard, the buffer memory 38 is capable of greatly improving the data transfer rate performance between the host computer and the disk drive 30. During a write operation, the buffer memory 38 receives and stores data from the host computer and then transfers this data to the magnetic disk 31, via the channel 36. During a read operation, the buffer memory 38 receives data from the magnetic disk 31, via the channel, stores the data, and then transfers the data to the host computer. The buffer memory 38 is controlled by the processor 42 which controls, among other things, the reception, storage, and transfer of data by the buffer memory 38. The amount of data retained in the buffer memory is variable to account for the variable data rates of different tracks of the disk, among other things. For example, a track associated with a higher data rate will transfer a larger amount of data during a fixed period of time than a track associated with a lower data rate. After a data sector has been retained in the buffer memory for a substantially fixed period of time, the buffer memory storage location associated with that data sector is released to receive new data from the host computer.

The interface 40 is operative for providing data compatibility between the disk drive 30 and the external host computer. The interface 40 is also controlled by processor 42.

The servo unit 44 is operative for controlling the actuator assembly 34 to position the read/write head 33 above a desired track on the magnetic disk 31. The servo unit 44 receives servo signals from the read/write head 33 which indicate the present location of the head above the disk 32. The servo unit 44 also receives a signal from the processor 42 indicating the track over which the read/write head 33 should be located. The servo unit 44 uses these signals to create a servo signal which is sent to the actuator assembly 34 to move and maintain the read/write head 33 at the desired track location. The servo unit 44 also sends a signal to the processor 42 indicating each time that the read/write head 33 has encountered a servo sample region and each time that the read/write head has encountered the end of a data sector during either a read or a write operation.

The shock sensor unit 46 is operative for detecting physical shocks to the disk drive 30 which may compromise data being transferred between the magnetic disk 31 and the host computer. The shock sensor unit 46 communicates the detection of a shock to the servo unit 44 which, in turn, communicates the detection of the shock to the processor 42. The shock information is then used by the processor 42 in controlling, among other things, the buffer memory 38.

In general, the processor 42 is operative for coordinating the timing and operation of the disk drive 30. The processor 42 receives commands from the host computer, via the interface 40, and processes these commands by controlling the operation of the channel 36, the buffer memory 38, the interface 40, and the servo 44 to position the read/write head 33 over the desired track location. For example, the processor 42 keeps track of what type of operation is currently being performed by the disk drive 30, controls the use of buffer memory space, and controls the timing of data transfers within the drive 30. The processor 42 includes an internal random access memory (RAM) for aiding in the control function. The processor 42 can be in the form of a conventional microprocessor or a digital signal processor, such as the Texas Instruments TMS 320C2XLP.

Operation of the system 30 of FIG. 3 during a write operation is substantially as follows. The host delivers a command to the disk drive, via input port 48, instructing the drive 30 to store forthcoming data in a particular location on the magnetic disk 31. The command is received by the interface 40 which delivers it to the processor 42. The processor 42 then configures the system for the reception and storing of the forthcoming data. The processor 42 causes the incoming data to be temporarily stored in the buffer memory 38. The incoming data is generally divided into separate data packets, called data sectors, and therefore the buffer memory is generally divided into a plurality of data storage locations, each having a storage capacity of one data sector. If the quantity of data being stored by the host computer is greater than the overall capacity of the buffer memory 38, the processor 42 suspends the transfer of incoming data into the buffer memory until storage locations in the buffer are released, i.e., the processor 42 determines that the data sectors stored in those storage locations have been successfully transferred to the disk 32.

Before any transfer of data between the buffer and the disk takes place, the processor 42 must cause the read/write head 33 to be moved to the location on the disk 32 specified by the host. The processor 42 instructs the servo unit 44 as to the proper location and the servo unit 44 causes the actuator motor to move the head 33 to that location. The processor 42 then updates the location given to the servo unit 44 as data is transferred to the disk 32 as needed.

Once there is data in the buffer memory 38 and the head 33 is properly located, the processor 42 will begin to transfer data from the buffer memory 38 to the magnetic disk 31, via the channel 36 and the read/write head 33. As data is being transferred between the buffer memory 38 and the disk 32, the processor 42 must determine which storage locations of the buffer memory 38 may be released to accept new data from the host computer. The processor 42 will release a storage location once it has determined that the data sector stored in that location has been successfully transferred to the disk. Data is not considered to be successfully transferred to the disk 32 if an error condition which is capable of compromising the transferred data occurred while the data was being transferred. Examples of such errors include: physical shock, misread servo data, misread ID data, and other mechanical or electrical problems. If an error condition occurs, therefore, all possibly affected data must be retransferred.

Figure 4:
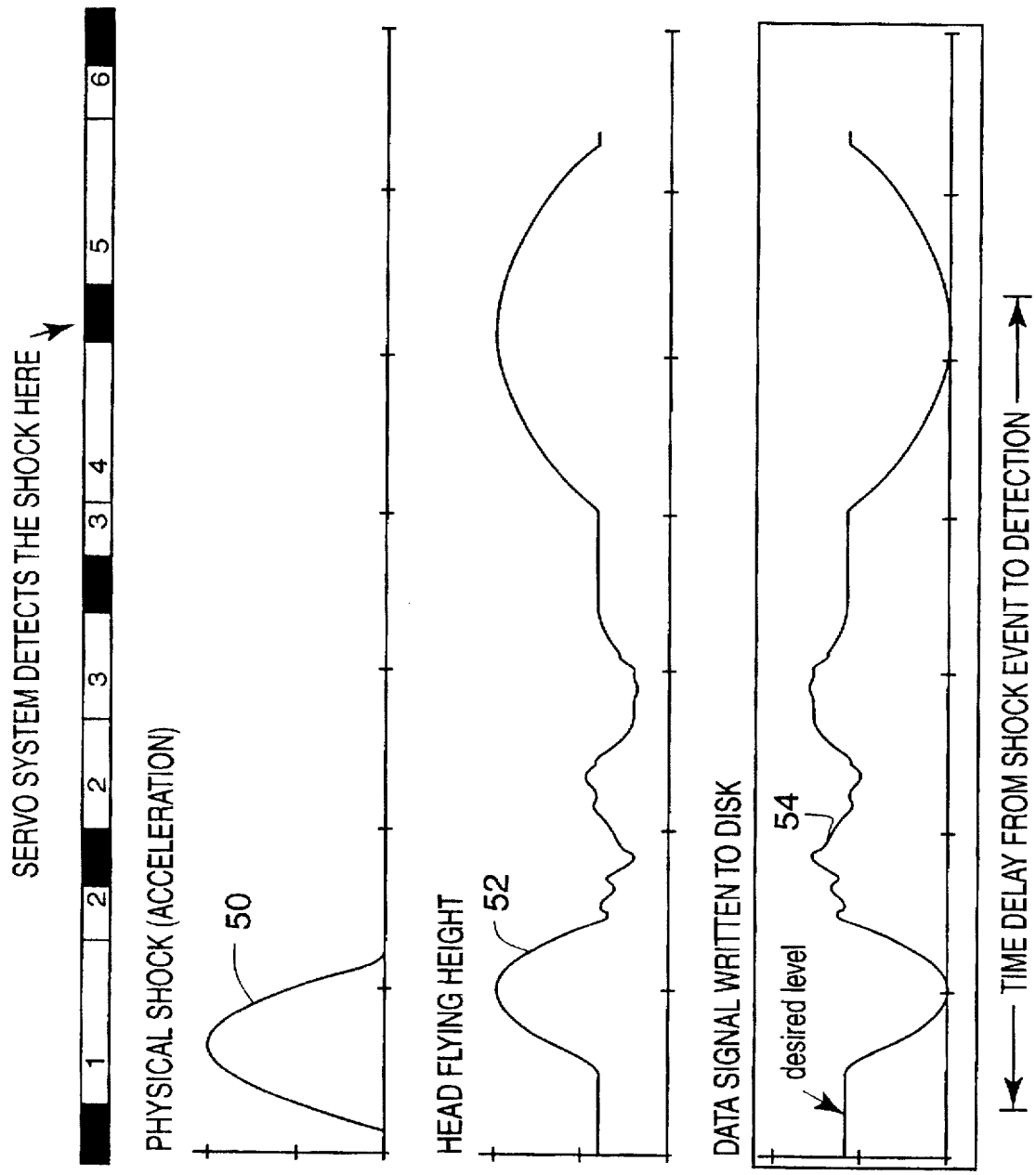
FIG. 4 is a series of graphs illustrating the possible delay between the occurrence of an error event and the detection of that error event in a disk drive system.

A problem which occurs with error conditions is that in many cases an error condition is not detected until a period of time after it may have compromised transferred data. To illustrate this problem, reference is made to FIG. 4. Curve 50 of FIG. 4 represents a physical shock occurring in a disk drive. Curve 52 illustrates the effect the physical shock may have on the flying height of the read/write head of the disk drive over an extended time period. Curve 54 illustrates the effect the flying height variation may have on the level of the signal written to the disk. This variation in the signal level is capable of compromising the accuracy of the data written to the disk. As illustrated in FIG. 4, a delay exists between the time of the shock and the time the shock is detected by the disk drive. Therefore, all data written between the time of the shock and the time of detection should be rewritten to ensure the accuracy of the written data. In the example of FIG. 4, this requires data sectors 1–4 to be rewritten. In a track having a higher data sector per data region ratio, the same shock would effect a larger number of data sectors and hence require a larger amount of data to be rewritten.

The present invention retains a variable amount of data in the buffer memory 38 after the data has been transferred to a magnetic disk during a write operation. The amount of data retained in the buffer memory is related to a fixed period of time, such as the maximum delay period between the occurrence of an error condition and the detection of that error condition. The amount of data retained is also related to the rate at which data is transferred to the disk, which varies according to track location.

In one embodiment of the invention, variation in the amount of data retained is implemented in the processor 42 of the disk drive system 30 of FIG. 3 using an end of sector counter (EOS), a shift register (SR), a write pointer (WP), and a buffer release pointer (BRP). More specifically, as the read/write head 33 is writing data to a track of disk 32, the processor 42 receives a signal each time the head 33 passes a servo sample region. In addition, the processor 42 receives a signal each time the head 33 finishes writing a data sector to the disk 32. The EOS is a counter/register which keeps track of how many data sectors the head 33 has finished writing since the last servo sample region was passed by the head. (The value retained in the EOS relates to the data transfer rate.) The SR contains a predetermined number of cells, X, each capable of storing the maximum counter value which may be stored in the EOS for any track on the disk 32. (The number of cells in the SR relates to the predetermined period of time associated with error conditions.) The WP provides a value which points to the location in the buffer memory of the data sector presently being written to the disk 32. The BRP provides a value which points to the last storage location in the buffer memory which has been released and can now receive new data from the host computer system. The values in the EOS, SR, BRP and WP are used by the processor 42 in controlling the buffer 38.

Each time the head 33 passes over a servo sample region, which results in a corresponding servo signal being provided to the processor 42, the amount of data to be retained in the buffer 38 is adjusted and available buffer space updated. Specifically, the BRP is increased by the value stored in the last cell of the SR to release a corresponding number of memory locations in the buffer memory 38 so that new data from the host computer can be stored therein. The current value in the EOS is shifted into the first cell of the SR and the values in the other cells of the SR are shifted one cell over to adjust the amount of retained data. Accordingly, the value stored in the last cell of the SR is shifted out of the SR. The EOS is then cleared. The value stored in the WP is incremented automatically as each data sector is written to the disk.

At any one time, the sum of all of the values stored in the SR and the value stored in the EOS represents the total number of data sectors being retained in the buffer memory 38 Therefore, each time a servo sample region is passed by the head 33, the number of data sectors being retained in the buffer memory 38 is increased by the value stored in the EOS and decreased by the value stored in the last cell of the SR. Data is retained in the buffer for a substantially fixed period of time related to the time it takes for the head 33 to pass X servo sample regions. The value of X is therefore chosen based upon a fixed time period, such as the maximum delay period between the occurrence of an error condition and the detection of that error condition. If an error condition is detected at any time during the transfer of data between the buffer memory 38 and the disk 32, the transfer of data is halted until the error condition is remedied and then all retained data in the buffer is retransferred.

Figure 5A:
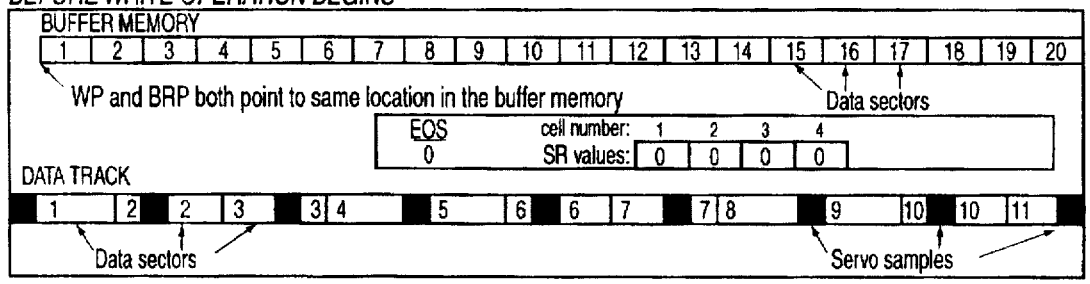
FIGS. 5A and 5B are a series of operational frames illustrating the operation of one embodiment of the present invention using a data track having a data sector/data region ratio of 4:3.
Figure 5A:
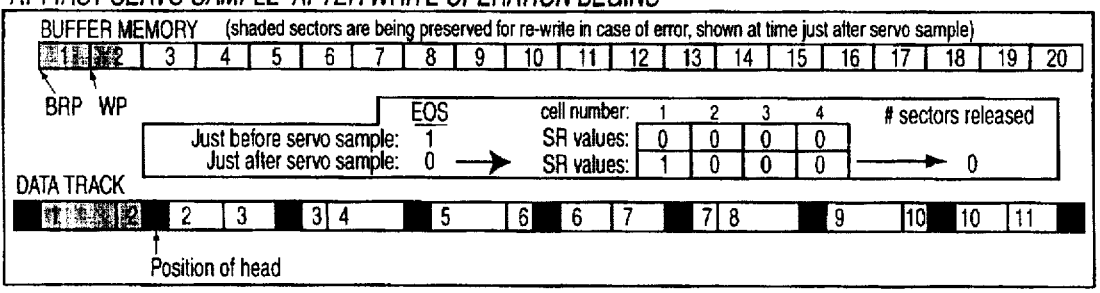
Figure 5A:
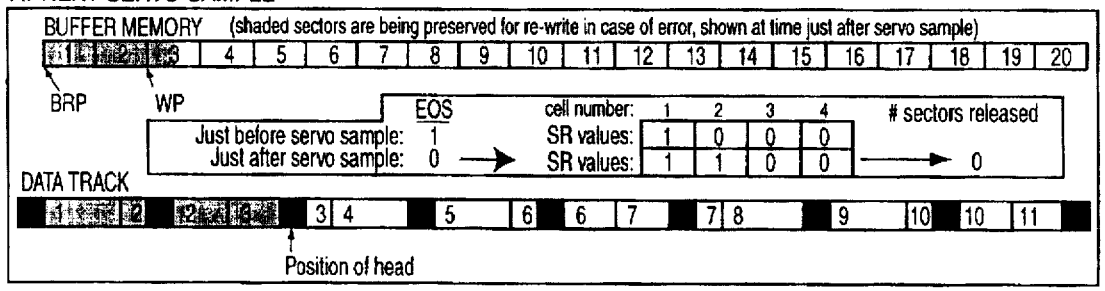
Figure 5A:
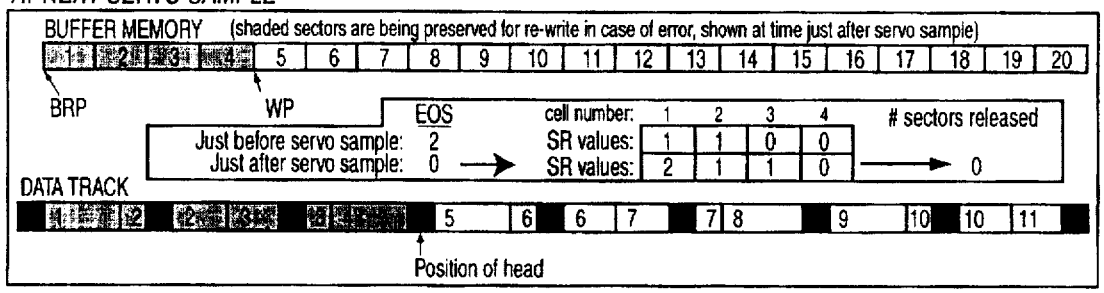
Figure 5B:
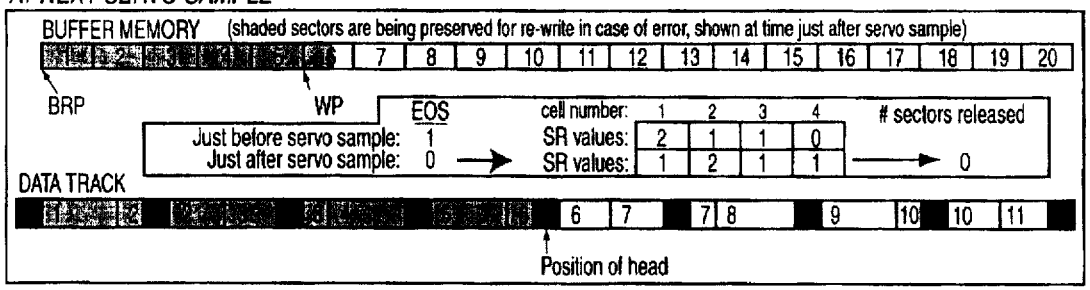
Figure 5B:
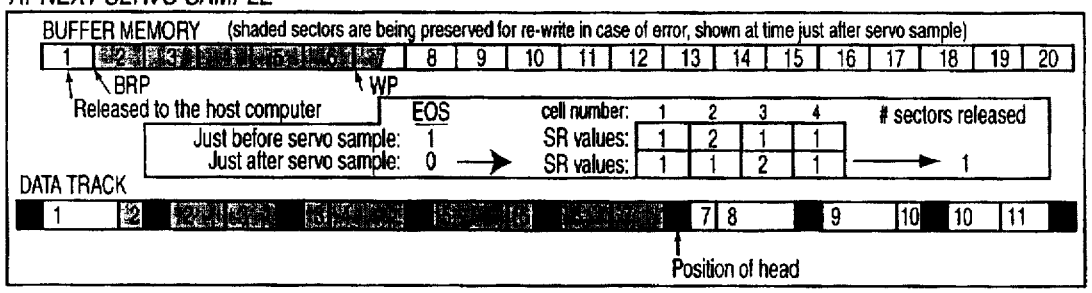
Figure 5B:
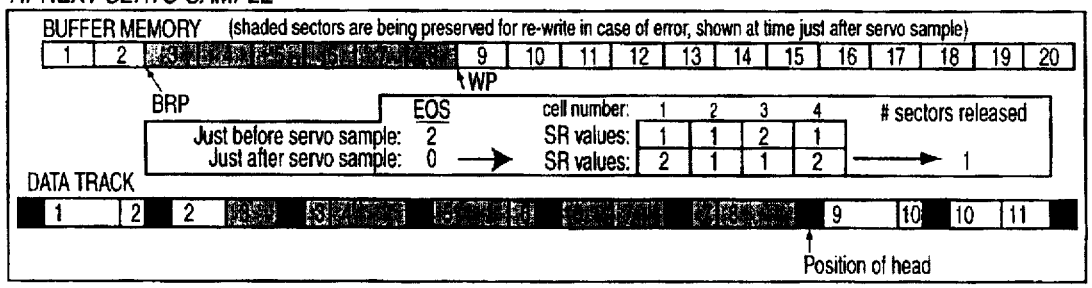
Figure 5B:
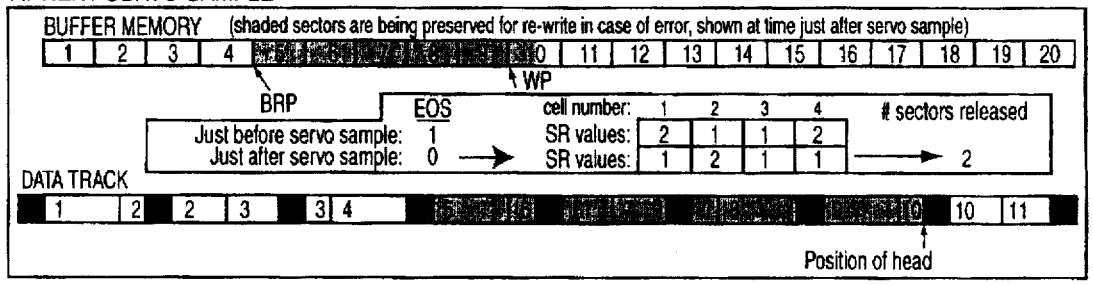
Figure 6A:
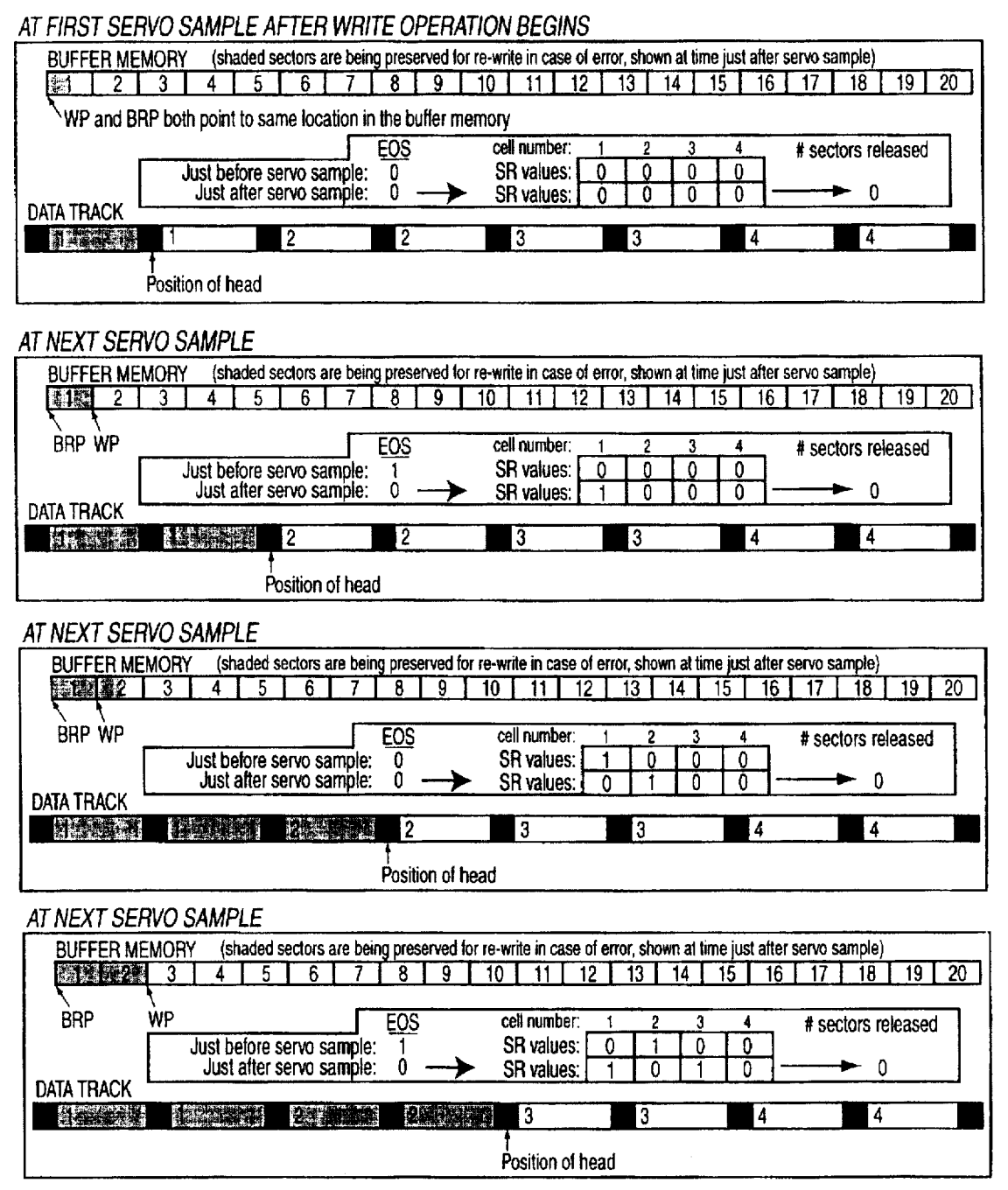
Figure 6B:
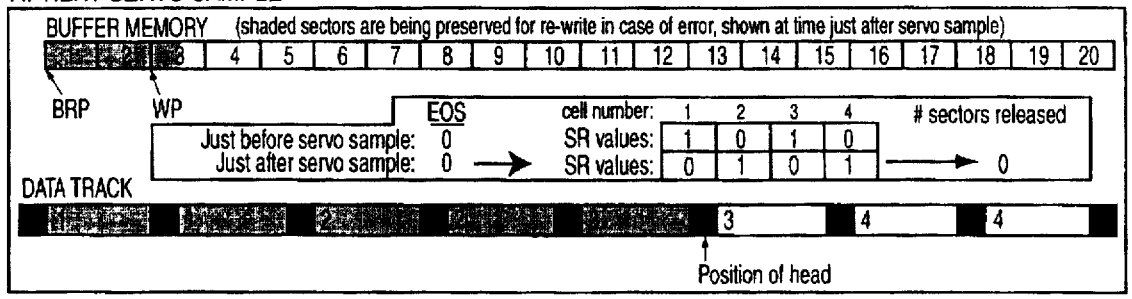
Figure 6B:
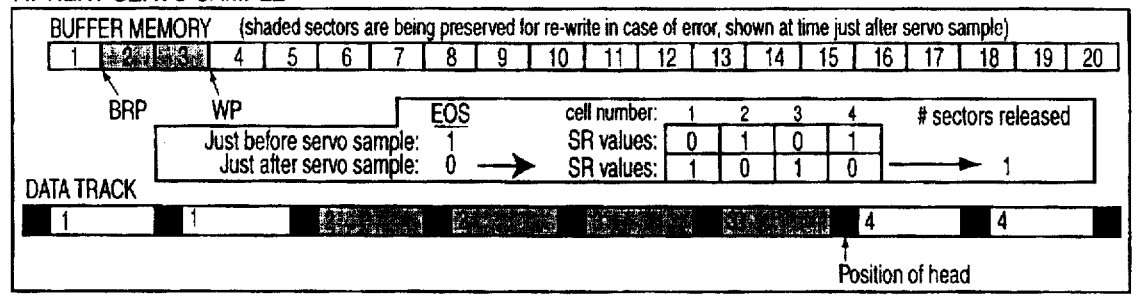
Figure 6B:
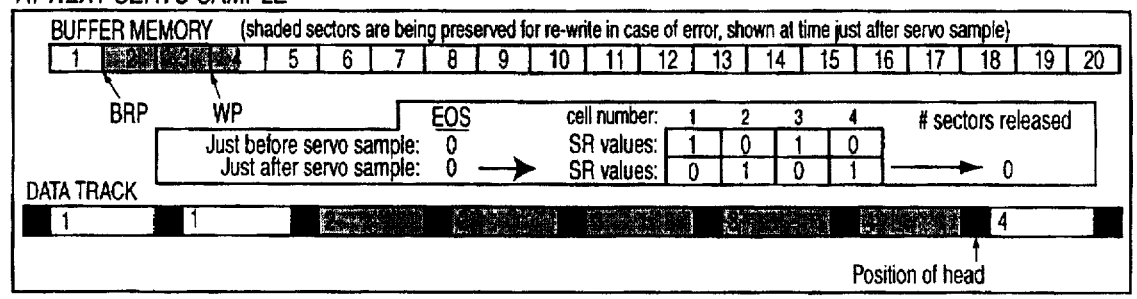

FIGS. 5A, 5B, 6A, and 6B illustrate the operation of the above described apparatus, having an SR with 4 cells, for two different tracks of a variable data rate magnetic disk. FIGS. 5A and 5B correspond to a track having a data sector to data region ratio of 4:3. FIGS. 6A and 6B correspond to a track having a data sector to data region ratio of 1:2. Each frame in the figures illustrates how the values stored in the EOS, SR, WP, and BRP change as the read/write head 33 passes each consecutive servo sample region. Shaded regions represent data being retained in the buffer memory after the data has been transferred between the buffer memory 38 and the disk 32.

As seen in the figures, the invention automatically adjusts the amount of data, i.e., the number of data sectors, retained in the buffer memory from track to track. The amount of data retained may also change from servo sample region to servo sample region within a single track because data sectors can be split by a servo sample region. Consequently, sometimes the amount of preserved data corresponds to a time period slightly longer than the fixed time period desired; however, the excess data is never more than that which may occur within a fraction of a data region. This ensures that enough data has been retained in the buffer memory 38 to retransfer all data sectors which the head completed writing to the disk 32 within the past X data regions if an error condition is detected.

In another embodiment, the present invention provides an apparatus for retaining a variable amount of data in a buffer memory after the data has been transferred to the buffer memory during a read operation. After a sector of data has been retained for a substantially fixed period of time in the buffer memory, it is transferred from the buffer memory to the host computer. After the data sector has been transferred to the host computer, the corresponding storage location in the buffer is released to accept more data from the magnetic disk.

As with the previous embodiment, the present embodiment is implemented in the processor 42 of the disk drive system 30 of FIG. 3 using an end of sector counter (EOS), a shift register (SR), a read pointer (RP), and a buffer release pointer (BRP). The EOS, SR, and BRP perform substantially the same functions as the corresponding units in the previous embodiment. The EOS keeps track of the number of data sectors which the read/write head 33 has finished reading from the disk 32 since a previous servo sample region was passed. The value stored in the EOS therefore relates to the data rate associated with the track being read. The SR contains a predetermined number of cells, each capable of storing the maximum counter value of the EOS. The number of cells in the SR relates to the predetermined period of time associated with error conditions. The BRP provides a value which points to the last storage location in the buffer memory which was released. After a storage location has been released, the data sector stored in that location is transferred to the host computer and the storage location is then free to accept new data from the disk. The RP is used to point to the next sector in the buffer 38 to which data is to be transferred from the disk 32. Thus, the RP is incremented as each sector is read from the disk 32. The values in the EOS, SR, BRP, and RP are used by the processor to control the buffer 38.

After the read/write head 33 passes a new servo sample region, the BRP is increased by the value stored in the last cell of the SR, the value stored in the EOS is shifted into the first cell of the SR, the EOS is cleared, and the values stored in the other cells of the SR are shifted over one cell. At any particular time, the sum of the values stored in the cells of the SR and in the EOS represents the total number of data sectors being retained in the buffer. If an error condition is detected during the transfer of data from the disk 32 to the buffer memory 38, the transfer of data is suspended until the error condition is remedied after which the retained data in the buffer memory 38 is reread from the disk 32 before being transferred to the host computer.

Although the present invention has been described in conjunction with its preferred embodiments, it is to be understood that modifications and variations may be resorted to without departing from the spirit and scope of the invention as those skilled in the art readily understand. For example, the invention could be used with an optical disk. Also, the invention could be used in a system which does not group data into data sectors for transfer between the host and the disk drive, but instead transfers data a bit by bit. In addition, the invention may use a clock derived in the data channel to keep track of the data rate associated with a particular track. Such modifications and variations are considered to be within the purview and scope of the invention and the appended claims.

What is claimed is:

1. A method for assuring that the desired data is transferred between a disk drive and a host system during read or write operations, comprising the steps of:

providing a disk onto which data may be written, wherein said disk includes a first concentric data track with a first radius and a second concentric data track with a second radius that is greater than said first radius, said first concentric data track containing less data than said second concentric data track over the same angular distance;

providing a spindle motor for rotating said disk at a substantially constant angular velocity;

providing means for transferring data between said disk and a host system, wherein said means for transferring data includes means for transferring data with said first concentric data track of said disk at a first data rate and said second concentric data track of said disk at a second data rate that is greater than said first data rate;

providing buffer means, located between said means for transferring and said host system, for providing temporary storage of data as said data is being transferred between said magnetic disk and said host system, said buffer having a predetermined number of data storage locations for the storage of said data;

receiving and storing data being transferred between said disk and said host system, in said buffer means;

retaining an amount of data in said buffer means for a predetermined period of time after said data has been transferred between said disk and said buffer means, for possible retransfer between said disk and said buffer means, said predetermined period of time being provided to one of said host and said disk drive before said data is transferred between said disk and said buffer means; releasing data storage locations in said buffer means for the storage of new data after data has been retained in said data storage locations for said predetermined period of time;

adjusting the amount of data retained by said buffer means, in said step of retaining, using information relating to whether data is being transferred between said disk and said buffer means at said first data rate or said second data rate to optimize data transfer performance between said disk and said buffer means;

monitoring said disk drive to detect the occurrence of an event, different from a determination of an error in the data transferred, that may cause the data transferred between said disk and said buffer means to be compromised; and retransferring said data, when an event is detected in said step of monitoring, between said magnetic disk and said buffer means.

2. The method, as claimed in claim 1, wherein:

said data being transferred between said disk drive and said host system is grouped into data sectors that each contain a predetermined number of data bits;

wherein said step of providing a disk includes providing a disk wherein said first and second concentric data tracks are each divided into an equal number of data regions that each contain at least a portion of a data sector;

wherein said first concentric data track contains fewer data sectors than said second concentric data track.

3. The method, as claimed in claim 1, wherein:

said amount of data retained in said buffer means in said retaining step is related to the amount of data transferred between said disk and said buffer means in a substantially fixed amount of time.

4. The method, as claimed in claim 2, wherein:

said information relating to whether data is being transferred between said disk and said buffer at a first data rate or a second data rate relates to a number of data sectors per data region in the track being accessed.

5. The method, as claimed in claim 1, wherein:

said substantially fixed amount of time includes a multiple of a servo sampling interval.

6. The method, as claimed in claim 2, wherein:

said step of adjusting includes adjusting the amount of data retained by said buffer means, in said step of retaining, so that all data sectors in said buffer that were most recently transferred between said buffer and said disk over a predetermined number of data regions are retained.

7. The method, as claimed in claim 6, wherein:

said predetermined number of data regions is chosen based on error event detection times.

8. The method, as claimed in claim 2, wherein:

said step of adjusting includes adjusting the number of data sectors that are retained as data is transferred between said buffer and said disk.

9. The method, as claimed in claim 2, wherein:

said step of adjusting includes:

performing a data transfer between a predetermined track of said disk and said host system;

first counting the number of data sectors transferred between said buffer and a first data region on said predetermined track of said disk;

second counting, after said first counting, the number of data sectors transferred between said buffer and a second data region on said predetermined track of said disk;

increasing the number of data sectors being retained in said buffer means by the number of data sectors counted during said step of second counting; and decreasing the number of data sectors being retained in said buffer means by the number of data sectors counted during said step of first counting.

10. The method, as claimed in claim 1, wherein:

said step of monitoring includes monitoring to detect the occurrence of an event including one of the following: physical shock to said disk drive, misread servo data, misread ID data, and internal mechanical problems.

11. The method, as claimed in claim 9, wherein:

the number of data sectors transferred between said buffer and said first data region of said disk includes a data sector for which transfer was initiated in a previous data region to said first data region and completed in said first data region; and the number of data sectors transferred between said buffer and said second data region of said disk includes a data sector for which transfer was initiated in a previous

11 data region to said second data region and completed in said second data region.

12. A method for assuring that the desired data is transferred between a disk drive and an exterior environment during read or write operations, comprising the steps of:

providing a disk having a plurality of concentric tracks onto which data sectors may be written, said tracks each being divided into an equal number of data regions separated from one another by servo sample regions, wherein the number of data sectors stored in each data region varies between at least two of said plurality of concentric tracks;

providing a spindle motor for rotating said disk at a substantially constant velocity;

providing a read/write head for sensing data from a track of said disk during a read operation and for inducing data into a track of said magnetic disk during a write operation;

providing head location means for locating said head over a desired track of said magnetic disk in response to a signal from an exterior environment;

providing a variable data rate channel for reading data from and for writing data to said disk, the data rate of said channel depending upon the number of data sectors stored in each data region of said desired track;

providing buffer means, located between said channel and said exterior environment, for providing temporary storage of data as said data sectors are being transferred between said disk and said exterior environment during read and write operations, said buffer having a predetermined number of storage locations for storing a predetermined number of data sectors;

transferring data sectors between said disk and said exterior environment;

receiving and storing data sectors being transferred between said disk and said exterior environment, in said buffer means;

retaining a number of data sectors in said buffer means after said data sectors have been transferred between said disk and said buffer means, for possible retransfer between said disk and said buffer means, before releasing corresponding storage locations in said buffer means for the storage of new data sectors; and adjusting the number of data sectors retained by said buffer means in said retaining step based on the number of data sectors transferred between said disk and said buffer means in a substantially fixed time period for providing efficient data transfer rate performance between said disk and said exterior environment.

13. The method, as claimed in claim 12, further including the steps of:

monitoring said disk drive for the occurrence of an event that may cause the data sectors transferred between said disk and said buffer means to be compromised; and retransferring, when an event is detected in said step of monitoring, said data sectors retained in said buffer, between said disk and said buffer means.

14. The method, as claimed in claim 12, wherein:

said step of providing a disk further includes the step of providing a disk having an innermost track and an outermost track, wherein the number of data sectors stored in each data region increases from a minimum value at said innermost track to a maximum value at said outermost track.

15. The method, as claimed in claim 12, wherein:

said step of adjusting includes determining the number of data sectors in said buffer means that were transferred between said buffer means and said disk over a predetermined number of data regions that were most recently traversed by said head.

16. The method, as claimed in claim 12, wherein:

said step of adjusting includes:

performing a data transfer between a predetermined track of said disk and said exterior environment;

first counting the number of data sectors transferred between said buffer and a first data region on said predetermined track of said disk;

second counting, after said first counting, the number of data sectors transferred between said buffer and a second data region on said predetermined track of said disk;

increasing the number of data sectors being retained in said buffer means by the number of data sectors counted during said step of second counting; and decreasing the number of data sectors being retained in said buffer means by the number of data sectors counted during said step of first counting.

17. The method, as claimed in claim 12, wherein:

said substantially fixed time period is chosen based on error event detection times.

18. The method, as claimed in claim 13, wherein:

said step of monitoring includes monitoring to detect the occurrence of an event including one of the following: physical shock to said disk drive, misread servo data, misread ID data, and internal mechanical problems.

19. An apparatus for assuring that the desired data is transferred between a disk drive and an exterior environment during read and write operations, comprising:

a magnetic disk onto which data may be written in the form of magnetic polarity transitions, wherein said magnetic disk includes a first concentric data track with a first radius and a second concentric data track with a second radius that is greater than said first radius, said first concentric data track containing less data than said second concentric data track over the same angular distance;

a spindle motor for rotating said magnetic disk at a substantially constant angular velocity;

means for transferring data between said disk and said exterior environment, wherein said means for transferring data includes means for transferring data with said first concentric data track at a first data rate and said second concentric data track at a second data rate that is greater than said first data rate;

buffer means, located between said means for transferring and said host system, for providing temporary storage of data as said data is being transferred between said magnetic disk and said exterior environment, said buffer being capable of storing a predetermined amount of data;

data retaining means for retaining an amount of data in said buffer means for a predetermined period of time after said data has been transferred between said disk and said buffer means, for possible retransfer between said disk and said buffer means, before releasing corresponding data storage locations in said buffer means for the storage of new data;

buffer control means for adjusting the amount of data being retained by said data retaining means based on a substantially fixed time period for providing efficient data transfer rate performance between said magnetic disk and said exterior environment.

20. The apparatus, as claimed in claim 19, further comprising:

means for sensing the occurrence of an event that may cause the data transferred between said magnetic disk and said buffer means to be compromised; and means for retransferring said data retained in said buffer, after an event has been sensed by said means for sensing, between said magnetic disk and said buffer means.

21. The apparatus, as claimed in claim 19, wherein:

said data being transferred between said disk drive and said exterior environment is divided into data sectors of constant length.

22. The apparatus, as claimed in claim 21, wherein:

said buffer control means includes:

counter means for counting the number of data sectors for which transfer between said magnetic disk and said buffer was completed for each data region passed by a read/write head, and for resetting to zero after each data region is passed by said read/write head;

shift register means having a predetermined number of storage cells, said shift register means for shifting the value stored in said counter means into a first cell after each data region is passed by said read/write head, and for shifting the values stored in each remaining cell one cell toward a last cell after each data region is passed by said read/write head, said value stored in said last cell being shifted out of said shift register means; and pointer means for storing a value which points to a location in said buffer means which marks the end of the data sectors being retained by said buffer means, wherein the value stored in said pointer means is incremented by the value stored in the last cell of said shift register means after each data region is passed by said read/write head and before said the value stored in said last cell is shifted out of said shift register.

23. The method, as claimed in claim 1, wherein:

said step of retaining includes retaining said data for a substantially fixed amount of time before releasing said corresponding data storage locations.

* * * * *